US012709528B2

(12) United States Patent
Kato et al.

(10) Patent No.: US 12,709,528 B2
(45) Date of Patent: Aug. 18, 2026

(54) FORKLIFT AND METHOD FOR CONTROLLING FORKLIFT

(71) Applicant: KABUSHIKI KAISHA TOYOTA JIDOSHOKKI, Kariya (JP)

(72) Inventors: Takuro Kato, Tsukuba (JP); Yukikazu Koide, Tsukuba (JP); Hironobu Okamoto, Tsukuba (JP); Yuta Inoue, Tsukuba (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 356 days.

(21) Appl. No.: 18/410,494

(22) Filed: Jan. 11, 2024

(65) Prior Publication Data

US 2024/0239637 A1 Jul. 18, 2024

(30) Foreign Application Priority Data

Jan. 17, 2023 (JP) ................................ 2023-005109

(51) Int. Cl.
*B66F 9/075* (2006.01)
*B66F 9/08* (2006.01)
*B66F 9/20* (2006.01)

(52) U.S. Cl.
CPC ............ *B66F 9/0755* (2013.01); *B66F 9/082* (2013.01); *B66F 9/20* (2013.01)

(58) Field of Classification Search
CPC .......... B66F 9/0755; B66F 9/082; B66F 9/20; B66F 9/22
USPC .......................................................... 414/636
See application file for complete search history.

(56) References Cited

U.S. PATENT DOCUMENTS 12,215,012 B2 * 2/2025 Koide .................. B66F 9/0755
12,351,441 B2 * 7/2025 Kato ......................... B66F 9/24
2019/0135599 A1 * 5/2019 Myers ...................... B66F 9/22

FOREIGN PATENT DOCUMENTS

JP 59-82299 A 5/1984
JP 2005-112540 A 4/2005
JP 6436553 B1 12/2018
JP 2022174514 A * 11/2022

* cited by examiner

*Primary Examiner* — James Keenan
(74) *Attorney, Agent, or Firm* — Sughrue Mion, PLLC

(57) ABSTRACT

A forklift includes a fork that mounts a pallet, a lift cylinder that raises and lowers the fork, and a tilt cylinder that tilts the fork. The pallet includes a first defining surface and a second defining surface that at least partially define an insertion opening into which an insertion portion of the fork is inserted and face each other in an up-down direction. The second defining surface is located below the first defining surface. The forklift lowers the fork until the insertion portion separates from the first defining surface with the pallet mounted on the fork, then tilts the fork forward until an internal pressure of the lift cylinder becomes less than the internal pressure in a state in which the pallet is not mounted on the fork, then tilts the fork rearward by a predetermined amount, and then pulls out the insertion portion from the insertion opening.

4 Claims, 7 Drawing Sheets

FORKLIFT AND METHOD FOR CONTROLLING FORKLIFT

BACKGROUND

1. Field

The present disclosure relates to a forklift and a method for controlling a forklift.

2. Description of Related Art

Japanese Patent No. 6436553 discloses a forklift that includes forks. Each fork is inserted into the insertion opening of a corresponding pallet.

The forklift pulls out the fork from the insertion opening after placing the pallet on a loading location. If this brings the fork into contact with a surface that defines the insertion opening, the position of the pallet may be shifted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a forklift that includes a fork that mounts a pallet, a lift cylinder that raises and lowers the fork, and a tilt cylinder that tilts the fork. The fork includes an insertion portion for insertion into an insertion opening of the pallet. The pallet includes a first defining surface and a second defining surface that at least partially define the insertion opening and face each other in an up-down direction. The second defining surface is located below the first defining surface. The forklift further includes a pressure sensor configured to detect an internal pressure of the lift cylinder, a contact sensor configured to detect whether the insertion portion is in contact with the first defining surface, and processing circuitry. The processing circuitry is configured to execute a process that lowers the fork until the contact sensor detects that the insertion portion is not in contact with the first defining surface in a state in which the pallet is mounted on the fork, execute, after the process that lowers the fork. The processing circuitry is also configured to execute a process that tilts the fork forward until the internal pressure of the lift cylinder detected by the pressure sensor becomes less than the internal pressure of the lift cylinder in a state in which the pallet is not mounted on the fork. The processing circuitry is also configured to execute a process that tilts the fork rearward by a predetermined amount after the process that tilts the fork forward. The processing circuitry is also configured to execute a process that pulls out the insertion portion from the insertion opening after the process that tilts the fork rearward by the predetermined amount.

Another aspect of the present disclosure provides a method for controlling a forklift. The forklift includes a fork that mounts a pallet, a lift cylinder that raises and lowers the fork, and a tilt cylinder that tilts the fork. The fork includes an insertion portion for insertion into an insertion opening of the pallet. The pallet includes a first defining surface and a second defining surface that at least partially define the insertion opening and face each other in an up-down direction. The second defining surface is located below the first defining surface. The method includes lowering the fork until the insertion portion separates from the first defining surface in a state in which the pallet is mounted on the fork. The method also includes, after lowering the fork, tilting the fork forward until the internal pressure of the lift cylinder becomes less than the internal pressure of the lift cylinder in a state in which the pallet is not mounted on the fork. The method also includes tilting the fork rearward by a predetermined amount after tilting the fork forward. The method also includes pulling out the insertion portion from the insertion opening after tilting the fork rearward by the predetermined amount.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A forklift according to an embodiment will now be described.

Forklift

Figure 1:
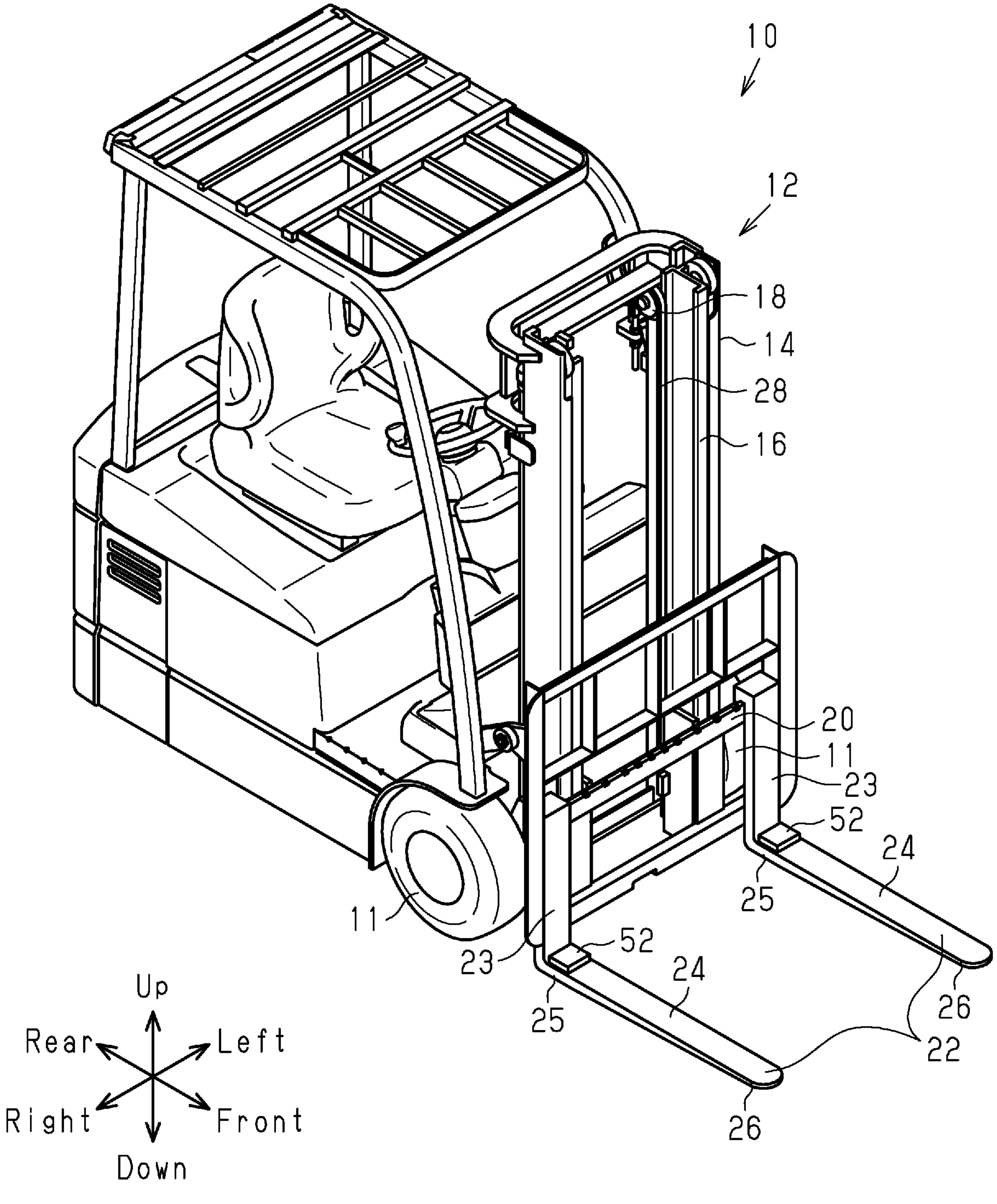
FIG. 1 is a perspective view of a forklift.

As shown in FIG. 1, a forklift 10 includes drive wheels 11. In the following description, the terms "front", "rear", "left", "right", "up", and "down" are defined with reference to the forklift 10.

Figure 2:
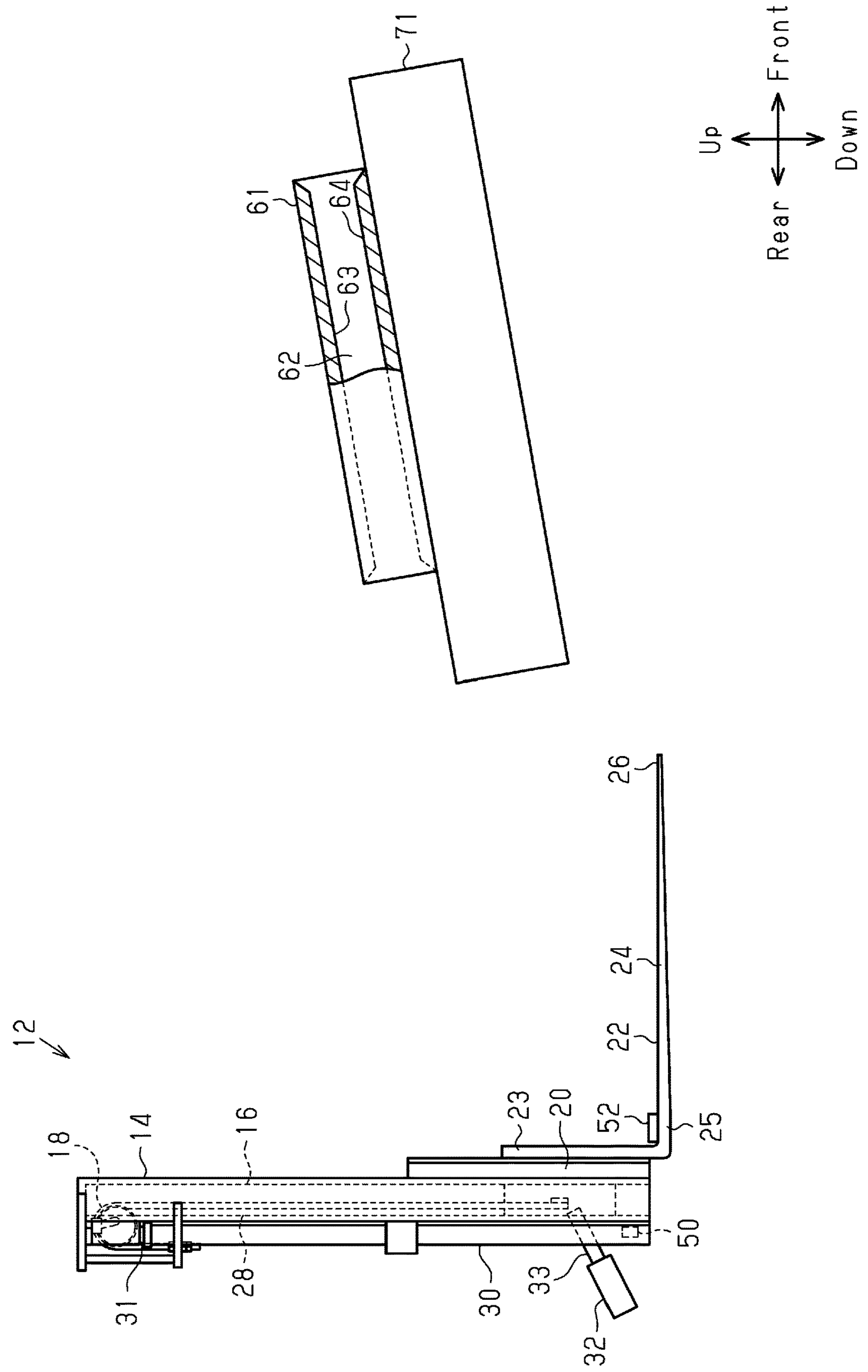
FIG. 2 is a side view of a cargo handling device of the forklift shown in FIG. 1.

As shown in FIGS. 1 and 2, the forklift 10 includes a cargo handling device 12. The cargo handling device 12 includes two outer masts 14 that are spaced apart from each other in the left-right direction and two inner masts 16 that respectively correspond to the outer masts 14. Each inner mast 16 can be raised and lowered relative to a corresponding outer mast 14.

The cargo handling device 12 includes two chain wheels 18. The two chain wheels 18 are spaced apart from each other in the left-right direction. The chain wheels 18 are respectively located on upper portions of the inner masts 16.

The cargo handling device 12 includes a lift bracket 20. The lift bracket 20 can be raised and lowered relative to the inner masts 16.

The cargo handling device 12 includes two forks 22. Each fork 22 is attached to the lift bracket 20. Each fork 22 includes an attachment portion 23. The attachment portion 23 is a part attached to the lift bracket 20. Each fork 22 includes an insertion portion 24. The insertion portions 24 respectively extend forward from the attachment portions 23. The insertion portions 24 each include a basal end 25 and a distal end 26. The distal end 26 is located forward from the basal end 25. The distance from the distal end 26 to the attachment portion 23 is longer than the distance from the basal end 25 to the attachment portion 23.

The cargo handling device 12 includes two lift chains 28. The first end of each lift chain 28 is fixed to a corresponding outer mast 14. The second end of each lift chain 28 is fixed to the lift bracket 20. The lift chains 28 are each placed over a corresponding one of the two chain wheels 18.

The cargo handling device 12 includes two lift cylinders 30. The two lift cylinders 30 are spaced apart from each other in the left-right direction. Each lift cylinder 30 is a hydraulic cylinder. Each lift cylinder 30 includes a rod 31. Each lift cylinder 30 lifts and lowers the forks 22. Specifically, when hydraulic oil is supplied to or discharged from each lift cylinder 30, the rod 31 extends or contracts so that the fork 22 moves up or down together with the lift bracket 20.

The cargo handling device 12 includes two tilt cylinders 32. The two tilt cylinders 32 are spaced apart from each other in the left-right direction. Each tilt cylinder 32 is a hydraulic cylinder. Each tilt cylinder 32 includes a rod 33. Each rod 33 is fixed to a corresponding outer mast 14. Each tilt cylinder 32 tilts the forks 22 in the front-rear direction. Specifically, when hydraulic oil is supplied to or discharged from each tilt cylinder 32, the rod 33 extends or contracts so that the fork 22 tilts.

Figure 3:
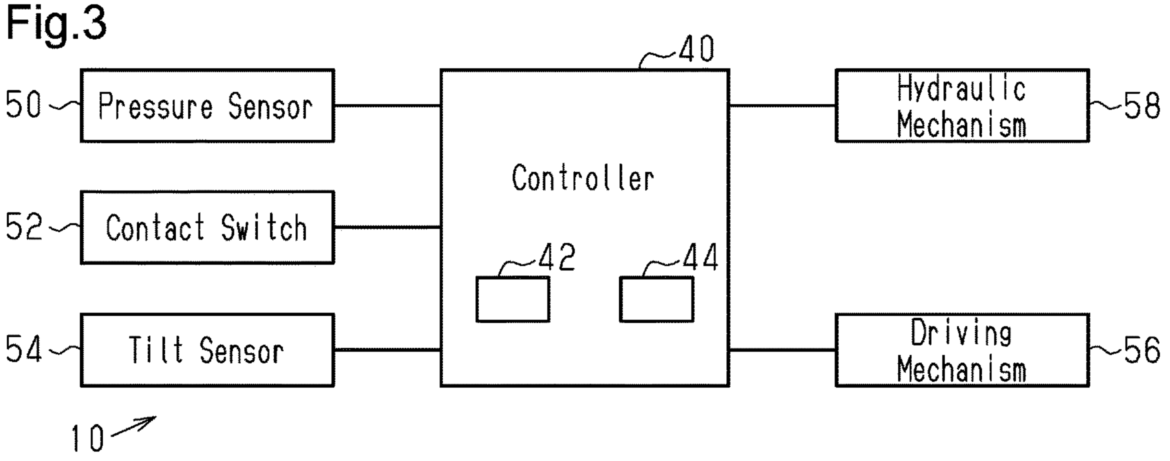
FIG. 3 is a schematic diagram of the forklift shown in FIG. 1.

As shown in FIG. 3, the forklift 10 includes a controller 40. The controller 40 includes a processor 42 and a memory 44. The processor 42 is, for example, a central processing unit (CPU), a graphics processing unit (GPU), or a digital signal processor (DSP). The memory 44 includes a random access memory (RAM) and a read-only memory (ROM). The memory 44 stores program codes or instructions configured to cause the processor 42 to execute processes. The memory 44, or a computer-readable medium, includes any type of medium that is accessible by general-purpose computers or dedicated computers. The controller 40 may include a hardware circuit such as an application-specific integrated circuit (ASIC) or a field-programmable gate array (FPGA). The controller 40, which is processing circuitry, may include one or more processors that run according to a computer program, one or more hardware circuits (e.g., ASIC or FPGA), or a combination thereof.

The forklift 10 includes one or more pressure sensors 50. The pressure sensor 50 is located inside the lift cylinder 30. The two lift cylinders 30 may each include one pressure sensor 50. Alternatively, only one of the two lift cylinders 30 may include a pressure sensor 50. The pressure sensor 50 detects the internal pressure of the lift cylinder 30. The internal pressure of the lift cylinder 30 is the hydraulic pressure of the lift cylinder 30. As the force applied to the rod 31 increases, the internal pressure of the lift cylinder 30 increases.

The forklift 10 includes one or more contact switches 52. The contact switch 52 is located on the upper surface of the insertion portion 24. In the present embodiment, for example, the two forks 22 each include one contact switch 52. The contact switch 52 is switched on and off depending on whether the contact switch 52 contacts an object. The contact switch 52 is off when the contact switch 52 is not in contact with an object. The contact switch 52 is on when the contact switch 52 is in contact with an object. In the present embodiment, the contact switch 52 is located at the basal end 25 of the insertion portion 24. The contact switch 52 is an example of a contact sensor.

The forklift 10 includes a tilt sensor 54. The tilt sensor 54 detects the tilt angle of the fork 22. The tilt angle of the fork 22 is the angle of the insertion portion 24 with respect to the horizontal direction. The tilt angle of the fork 22 is the amount by which the insertion portion 24 is tilted from the horizontal position, with the horizontal position being defined as 0 degrees.

The forklift 10 includes a driving mechanism 56. The driving mechanism 56 is a member that causes the forklift 10 to travel. In a forklift in which the drive wheels 11 are driven by a travel motor, the driving mechanism 56 includes the travel motor, a motor driver that drives the travel motor, and a steering device that steers the drive wheels 11. In a forklift in which the drive wheels 11 are driven by an engine, the driving mechanism 56 includes the engine, a supply device that supplies fuel to the engine, and a steering device that steers the drive wheels 11.

The forklift 10 includes a hydraulic mechanism 58. The hydraulic mechanism 58 controls the supplying and discharging of hydraulic oil to the lift cylinder 30 and the tilt cylinder 32. The hydraulic mechanism 58 includes a cargo handling motor used to drive a pump that discharges hydraulic oil. The hydraulic mechanism 58 further includes a control valve that distributes hydraulic oil.

The controller 40 operates the cargo handling device 12 by controlling the hydraulic mechanism 58. The forklift 10 is an automatic forklift that operates automatically through control by the controller 40.

As shown in FIG. 2, the pallet 61 includes an insertion opening 62. The insertion opening 62 is a space into which the insertion portion 24 is inserted. The pallet 61 includes a first defining surface 63 and a second defining surface 64. The first defining surface 63 and the second defining surface 64 are parts of the surface defining the insertion opening 62. The first defining surface 63 and the second defining surface 64 at least partially define the insertion opening 62. The first defining surface 63 and the second defining surface 64 are two surfaces that face each other in the up-down direction with the pallet 61 placed on a loading location 71. Of the surface defining the insertion opening 62, the first defining surface 63 is one of the two surfaces that face each other in the up-down direction. Of the surface defining the insertion opening 62, the second defining surface 64 is the other one of the two surfaces that face each other in the up-down direction. The second defining surface 64 is located below the first defining surface 63. The fork 22 mounts the pallet 61 by the insertion portion 24 supporting the first defining surface 63 with the insertion portion 24 inserted into the insertion opening 62. The controller 40 controls the hydraulic mechanism 58 so that the forklift 10 performs load placement, transferring the pallet 61 from the fork 22 onto the loading location 71.

The loading location 71 may be tilted with respect to the front-rear direction of the forklift 10. For example, when the loading location 71 is a loading platform for a truck, the mounting of a package on the loading platform sinks the suspension. This may tilt the loading location 71. In the present embodiment, even if the loading location 71 is tilted, the controller 40 controls the hydraulic mechanism 58 such that the pallet 61 can be placed on the loading location 71.

Loading Control

The loading control executed by the controller 40 will now be described. The loading control is executed after the pallet 61 is mounted on the fork 22. In a state in which the pallet 61 is mounted on the fork 22, the first defining surface 63 is supported by the insertion portion 24 inserted into the insertion opening 62. When the first defining surface 63 is in contact with the contact switch 52, the contact switch 52 is on. An example of a case in which the loading location 71 is tilted upward as seen from the forklift 10 will now be described. When the loading location 71 is tilted upward, one of the front-rear ends of the loading location 71 at which the distance to the forklift 10 is relatively short is located below the other end at which the distance to the forklift 10 is relatively long.

Figure 4:
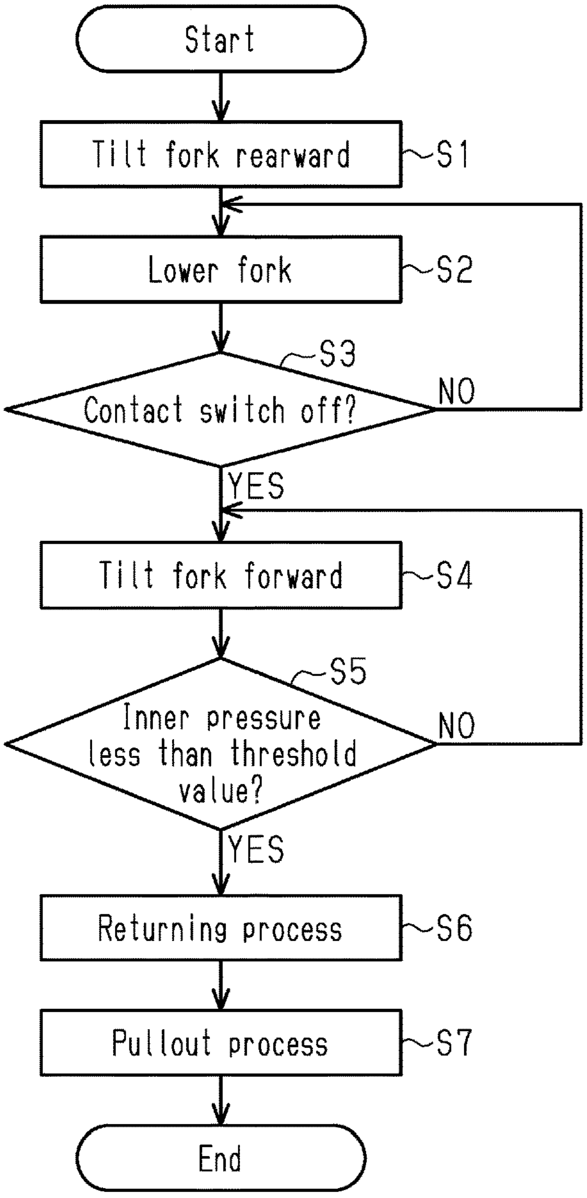
FIG. 4 is a flowchart illustrating a loading control executed by the controller shown in FIG. 3.
Figure 5:
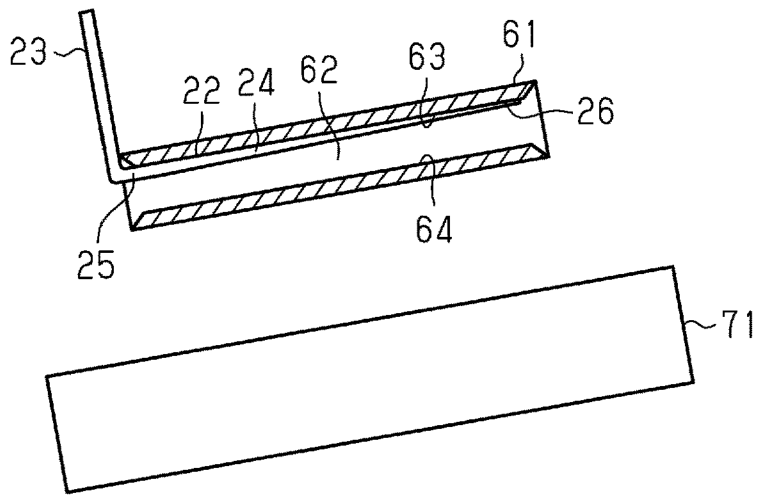
FIG. 5 is a diagram showing the fork on which the pallet is mounted.

As shown in FIGS. 4 and 5, in step S1, the controller 40 tilts the fork 22 until the tilt angle of the fork 22 reaches a predetermined angle. The predetermined angle is an angle with the fork 22 tilted rearward beyond 0°. The predetermined angle is defined in advance. When the fork 22 is tilted rearward to the predetermined angle, the distal end 26 of the insertion portion 24 is located above the basal end 25 of the insertion portion 24. As shown in FIG. 5, at the point in time when the process of step S1 is completed, the pallet 61 is located above the loading location 71. The controller 40 may move the pallet 61 to a position above the loading location 71 by advancing the forklift 10 after tilting the fork 22 rearward to the predetermined angle. The controller 40 may tilt the fork 22 rearward to the predetermined angle after the forklift 10 is advanced to move the pallet 61 to a position above the loading location 71. Step S1 is a process that positions the distal end 26 of the insertion portion 24 above the basal end 25 of the insertion portion 24 prior to step S2.

Subsequently, in step S2, the controller 40 lowers the fork 22.

Next, in step S3, the controller 40 determines whether the contact switch 52 is off. If the determination result of step S3 is negative, the controller 40 returns to the process of step S2. If the determination result of step S3 is affirmative, the controller 40 executes the process of step S4. The controller 40 continues lowering the fork 22 until the determination result of step S3 becomes affirmative. In a case in which the forklift 10 includes two or more contact switches 52, the controller 40 may execute step S3 using any one of the contact switches 52. Alternatively, in the case in which the forklift 10 includes two or more contact switches 52, the controller 40 may execute step S3 using all the contact switches 52. For example, the controller 40 may give an affirmative determination result in step S3 when all the contact switches 52 are turned off.

Figure 6:
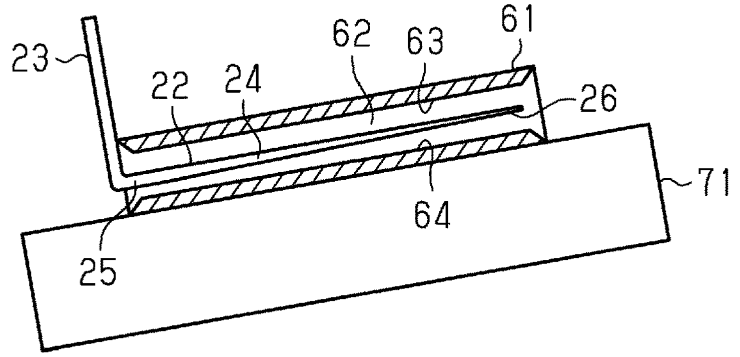
FIG. 6 is a diagram showing a state in which the fork of FIG. 5 is lowered.

As shown in FIG. 6, the controller 40 further lowers the fork 22 with the pallet 61 in contact with the loading location 71 due to the lowering of the fork 22. This causes the insertion portion 24 to separate from the first defining surface 63. This turns off the contact switch 52. Steps S2 and S3 are processes that lower the fork 22 until the contact switch 52 detects that the insertion portion 24 is not in contact with the first defining surface 63 in a state in which the pallet 61 is mounted on the fork 22. When the determination result of step S3 is affirmative, the pallet 61 is in a state of being placed on the loading location 71.

Then, as shown in FIG. 4, the controller 40 tilts the fork 22 forward in step S4.

Subsequently, in step S5, the controller 40 determines whether the internal pressure of the lift cylinder 30 detected by the pressure sensor 50 is less than a threshold value. If the determination result of step S5 is negative, the controller 40 returns to the process of step S4. If the determination result of step S5 is affirmative, the controller 40 executes the process of step S6. The controller 40 continues forward tilting of the fork 22 until the determination result of step S5 becomes affirmative. The threshold value is set to determine whether the internal pressure of the lift cylinder 30 detected by the pressure sensor 50 is less than the internal pressure of the lift cylinder 30 in a state in which the pallet 61 is not mounted on the fork 22. The threshold value is set to the internal pressure of the lift cylinder 30 in a state in which the pallet 61 is not mounted on the fork 22 or set to be slightly lower than the internal pressure of the lift cylinder 30 when the pallet 61 is not mounted on the fork 22. When the forklift 10 includes two or more pressure sensors 50, the controller 40 may execute the determination of step S5 using any one of the pressure sensors 50. When the forklift 10 includes two or more pressure sensors 50, the controller 40 may execute the determination in step S5 using all the pressure sensors 50. For example, the controller 40 may give an affirmative determination result in step S5 when the internal pressures of the lift cylinder 30 detected by all the pressure sensors 50 are less than the threshold value.

Figure 7:
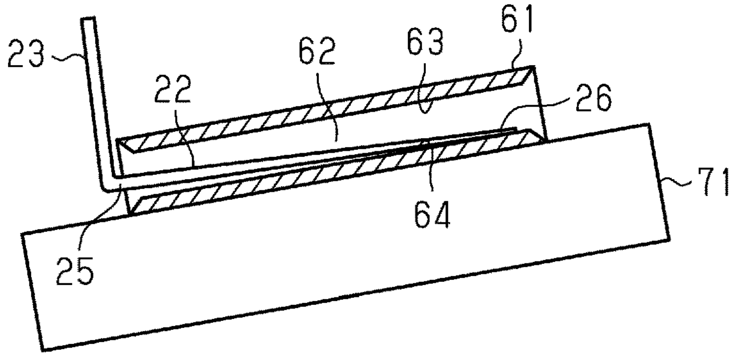
FIG. 7 is a diagram showing a state in which the fork of FIG. 6 is tilted forward.
Figure 8:
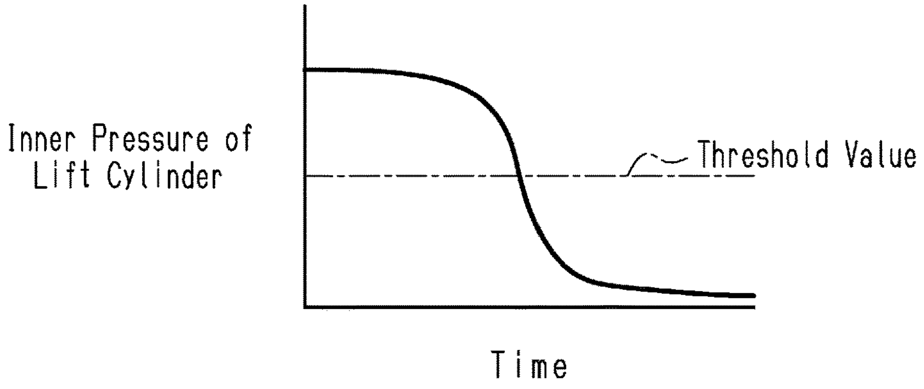
FIG. 8 is a graph illustrating the relationship between the time and the internal pressure of the lift cylinder.

When the fork 22 is tilted forward as shown in FIG. 7, the distal end 26 of the insertion portion 24 comes into contact with the second defining surface 64. When the distal end 26 of the insertion portion 24 comes into contact with the second defining surface 64, the load acting on the lift cylinder 30 is dispersed to the loading location 71 through the pallet 61. Even if the pallet 61 is not mounted on the fork 22, the lift cylinder 30 receives the load of the lift bracket 20 and the fork 22. As shown in FIG. 8, when the load applied to the lift cylinder 30 is dispersed to the loading location 71 through the pallet 61, the load of the lift bracket 20 and the fork 22 is dispersed to the loading location 71 so that the internal pressure of the lift cylinder 30 detected by the pressure sensor 50 becomes less than the threshold value. Steps S4 and S5 are processes that tilt the fork 22 until the internal pressure of the lift cylinder 30 detected by the pressure sensor 50 becomes less than the internal pressure of the lift cylinder 30 in the state in which the pallet 61 is not mounted on the fork 22. Steps S4 and S5 are executed subsequent to steps S2 and S3.

Figure 9:
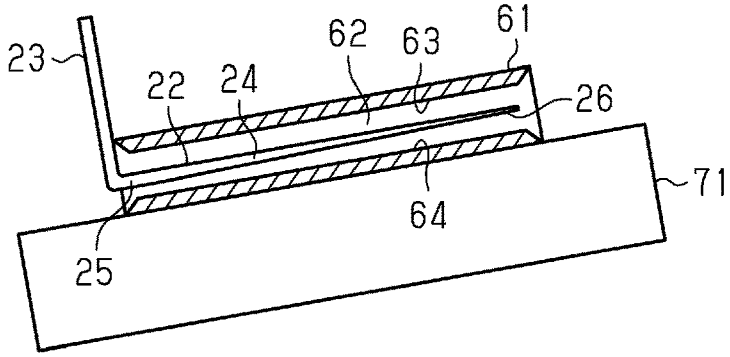
FIG. 9 is a diagram showing a state in which the fork of FIG. 7 is tilted rearward.

As shown in FIGS. 4 and 9, the controller 40 executes a returning process in step S6. The returning process is a process that tilts the fork 22 rearward by a predetermined amount after steps S4 and S5. The predetermined amount is a value defined in advance. The predetermined amount is set such that, when the fork 22 is tilted rearward from the state in which the distal end 26 of the insertion portion 24 is in contact with the second defining surface 64, the insertion portion 24 does not come into contact with either the first defining surface 63 or the second defining surface 64. Preferably, the predetermined amount is set such that the tilt of the insertion portion 24 is the same as the tilt of the loading location 71 between the first defining surface 63 and the second defining surface 64. The predetermined amount is set based on, for example, the dimension of the insertion opening 62 in the up-down direction, the length of the insertion portion 24, and the thickness of the insertion portion 24. If the forklift 10 is used in an environment in which multiple types of pallet 61 are present, the predetermined amount simply needs to be calculated using a pallet 61 having the smallest dimension of the insertion opening 62 in the up-down direction.

Next, in step S7, the controller 40 executes a pullout process. The pullout process is a process that pulls out the insertion portion 24 from the insertion opening 62 after step S6. The controller 40 reverses the forklift 10 by controlling the driving mechanism 56, while lowering the fork 22 by controlling the hydraulic mechanism 58. This causes the insertion portion 24 to be pulled out from the insertion opening 62. The amount by which the fork 22 is lowered relative to the reverse distance of the forklift 10 is set such that the insertion portion 24 does not come into contact with the first defining surface 63 or the second defining surface 64 during the pullout of the insertion portion 24.

When Loading Location is Tilted Downward

An example of a case in which the loading location 71 is tilted downward as seen from the forklift 10 will now be described. When the loading location 71 is tilted downward, one of the front-rear ends of the loading location 71 at which the distance to the forklift 10 is relatively short is located above the other end at which the distance to the forklift 10 is relatively long.

Figure 10:
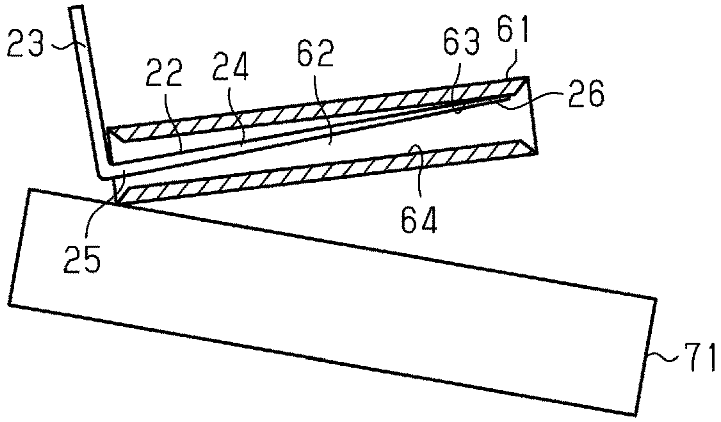
FIG. 10 is a diagram showing a state in which the fork is lowered when the loading location is tilted downward.

As shown in FIG. 10, in steps S2 and S3, when the controller 40 lowers the fork 22 until the contact switch 52 is turned off, part of the pallet 61 comes into contact with the loading location 71. In the same manner as the case in which the loading location 71 is tilted upward, the fork 22 is tilted rearward such that the distal end 26 of the insertion portion 24 is located above the basal end 25 of the insertion portion 24 in step S1.

Figure 11:
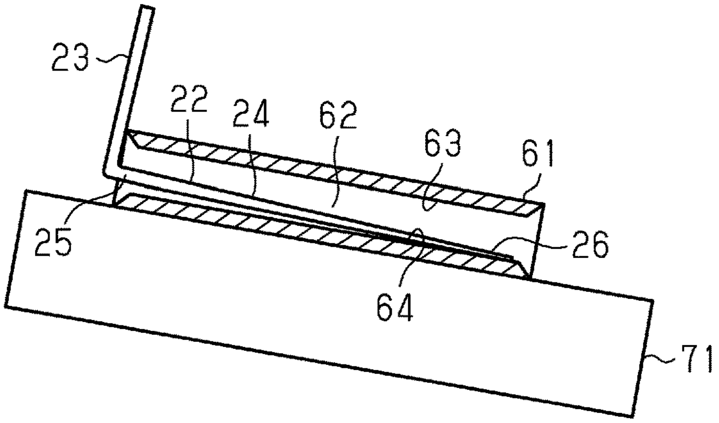
FIG. 11 is a diagram showing a state in which the fork of FIG. 10 is tilted forward.

In steps S4 and S5, the controller 40 tilts the fork 22 forward until the internal pressure of the lift cylinder 30 detected by the pressure sensor 50 becomes less than the threshold value. As shown in FIG. 11, when the internal pressure of the lift cylinder 30 detected by the pressure sensor 50 is less than the threshold value, the pallet 61 is placed on the loading location 71. Further, the distal end 26 of the insertion portion 24 is in contact with the second defining surface 64.

Figure 12:
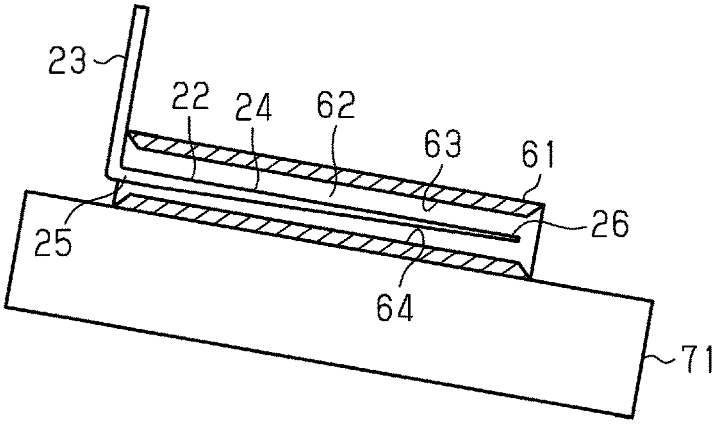
FIG. 12 is a diagram showing a state in which the fork of FIG. 11 is tilted rearward.

As shown in FIG. 12, the fork 22 is tilted rearward in step S6. As a result, the insertion portion 24 will not come into contact with the first defining surface 63 or the second defining surface 64. Whether the loading location 71 is tilted upward or downward, the positional relationship between the insertion portion 24 and the pallet 61 is the same at the point in time when the determination result of step S5 is affirmative. Thus, whether the loading location 71 is tilted upward or downward, the same predetermined amount needs to be set.

In step S7, the controller 40 executes a pullout process. When the loading location 71 is tilted downward, the controller 40 reverses the forklift 10 by controlling the driving mechanism 56, while raising the fork 22 by controlling the hydraulic mechanism 58. This causes the insertion portion 24 to be pulled out from the insertion opening 62. That is, whether the loading location 71 is inclined upward or downward will determine whether the fork 22 should be lowered or raised when pulling out the insertion portion 24. The amount by which the fork 22 is raised relative to the reverse distance of the forklift 10 is set such that the insertion portion 24 does not come into contact with the first defining surface 63 or the second defining surface 64 during the pullout of the insertion portion 24.

The determination of whether to lower or raise the fork 22 when pulling out the insertion portion 24 can be made, for example, from the tilt angle detected by the tilt sensor 54. The controller 40 lowers the fork 22 when pulling out the insertion portion 24 if the insertion portion 24 is tilted rearward from 0° at the point in time when the process of step S7 is started. The controller 40 raises the fork 22 when pulling out the insertion portion 24 if the insertion portion 24 is tilted forward from 0° at the point in time when the process of step S7 is started. The controller 40 pulls out the insertion portion 24 without tilting the fork 22 if the angle of the insertion portion 24 is 0° at the point in time when the process of step S7 is started.

Advantages of Present Embodiment (1) The controller 40 tilts the fork 22 until the internal pressure of the lift cylinder 30 detected by the pressure sensor 50 becomes less than the internal pressure of the lift cylinder 30 in a state in which the pallet 61 is not mounted on the fork 22. In this state, the distal end 26 of the insertion portion 24 is in contact with the second defining surface 64. Tilting the fork 22 rearward by the predetermined amount with reference to this state results in a state in which the insertion portion 24 is not in contact with either the first defining surface 63 or the second defining surface 64. Pulling out the insertion portion 24 from the insertion opening 62 from this state prevents the contact between the insertion portion 24 and the pallet 61 during the pullout of the insertion portion 24 from the insertion opening 62.

(2) In a state in which the distal end 26 of the insertion portion 24 is in contact with the second defining surface 64, the positional relationship between the fork 22 and the pallet 61 is the same whether the loading location 71 is tilted upward or downward. Regardless of the tilt of the loading location 71, tilting the fork 22 by the predetermined amount with reference to this state prevents the contact between the insertion portion 24 and the pallet 61 during the pullout of the insertion portion 24 from the insertion opening 62.

Figure 13:
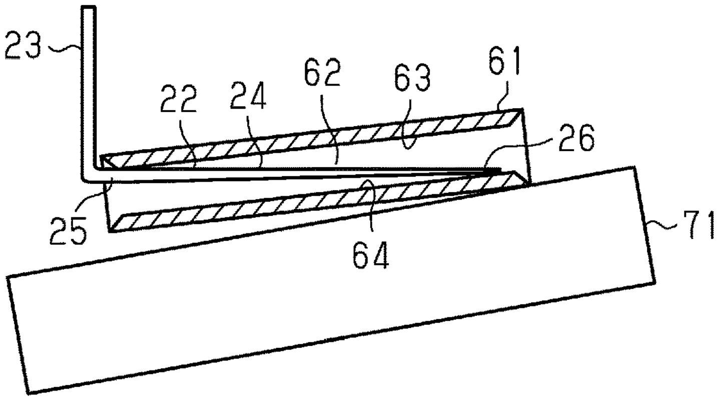
FIG. 13 is a diagram illustrating the relationship between the insertion portion and the pallet in a state in which the fork is lowered with the insertion portion arranged horizontally.

(3) When lowering the fork 22, the controller 40 lowers the fork 22 with the distal end 26 of the insertion portion 24 located above the basal end 25 of the insertion portion 24. As shown in FIG. 13, when the fork 22 is lowered with the insertion portions 24 horizontally oriented, there may be a case in which the basal end 25 of the insertion portion 24 does not separate from the first defining surface 63 if the loading location 71 is tilted upward. In this case, the determination result of step S3 will not be affirmative. By lowering the fork 22 with the distal end 26 of the insertion portion 24 located above the basal end 25 of the insertion portion 24, the basal end 25 of the insertion portion 24 separates from the first defining surface 63 even when the loading location 71 is tilted upward. Accordingly, regardless of whether the loading location 71 is tilted upward or downward, the lowering of the fork 22 is stopped by turning off the contact switch 52.

Modifications

The present embodiment may be modified as follows. The embodiment and the following modifications can be combined as long as the combined modifications remain technically consistent with each other.

Figure 14:
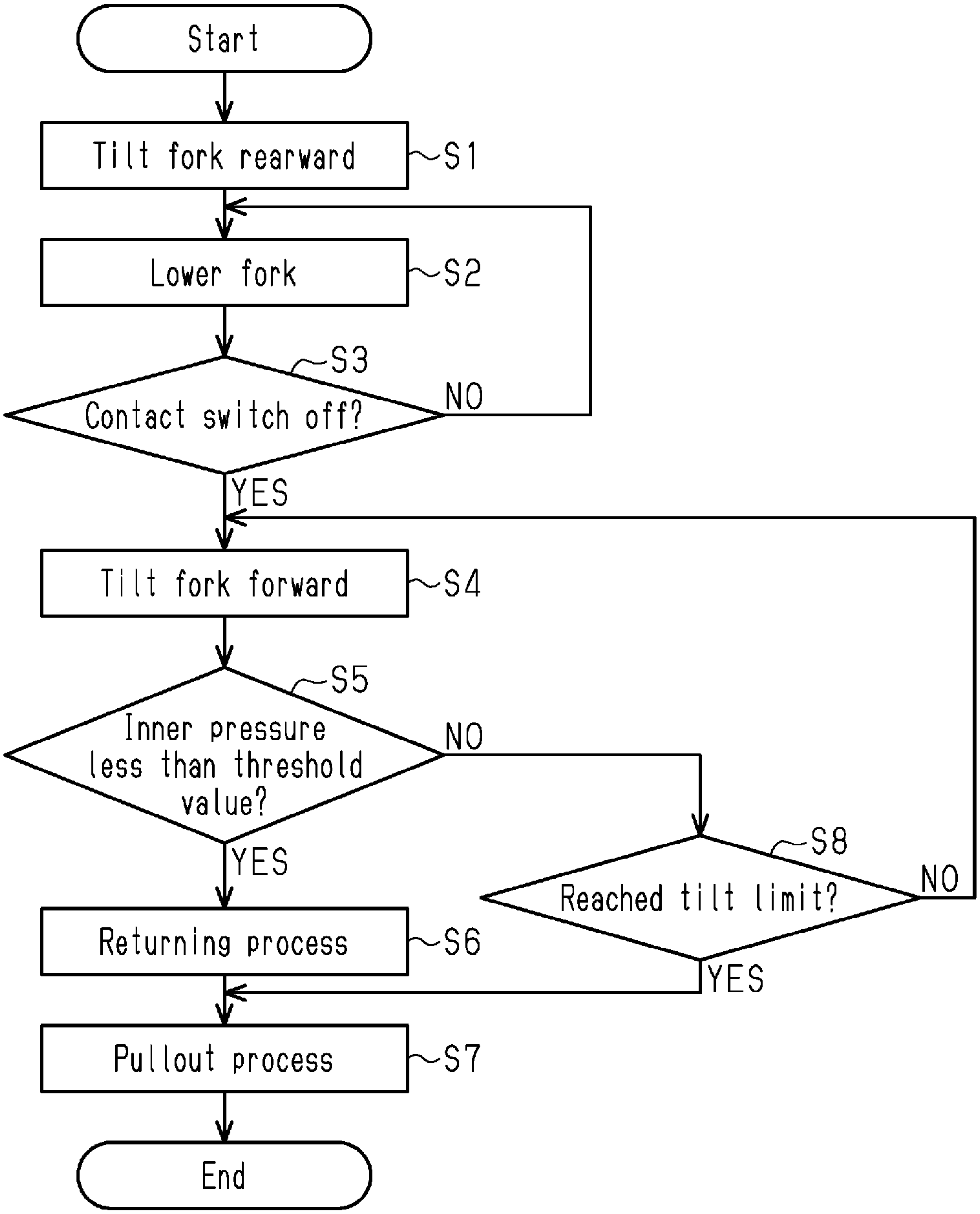
FIG. 14 is a flowchart illustrating the loading control according to a modification.

As shown in FIG. 14, when the determination result of step S5 is negative, the controller 40 may execute the determination of step S8. In step S8, the controller 40 determines whether the fork 22 has reached a tilt limit of the fork 22. There is a limit to the range in which the fork 22 can be tilted. This limit is the limit of tilting of the fork 22. The controller 40 determines whether the fork 22 has reached the tilt limit from, for example, the detection result of the tilt sensor 54. If the determination result of step S8 is affirmative, the controller 40 executes the process of step S7. If the determination result of step S8 is negative, the controller 40 returns to the process of step S4. That is, the controller 40 tilts the fork 22 forward until the determination result of step S5 or step S8 becomes affirmative. Accordingly, when the fork 22 reaches the tilt limit without the internal pressure of the lift cylinder 30 detected by the pressure sensor 50 becoming less than the threshold value during forward tilting of the fork 22, the controller 40 pulls out the insertion portion 24 from the insertion opening 62.

When the fork 22 reaches the tilt limit before the determination result of step S5 becomes affirmative, there may be a case in which the determination result of step S5 does not become affirmative. Even if the determination result of step S5 does not become affirmative due to the fork 22 reaching the tilt limit, the execution of the process of step S8 by the controller 40 allows the insertion portion 24 to be removed.

A distance meter may be used as a contact sensor. The distance meter is arranged to measure, for example, the distance from the insertion portion 24 to an object located above the insertion portion 24. In a state in which the insertion portion 24 is inserted into the insertion opening 62, the first defining surface 63 is located above the insertion portion 24. The distance meter is capable of measuring the distance between the insertion portion 24 and the first defining surface 63. The controller 40 is capable of determining whether the insertion portion 24 has come into contact with the first defining surface 63 from the distance between the insertion portion 24 and the first defining surface 63.

The controller 40 does not need to execute step S1. In this case, the contact switch 52 may be located at a position different from the basal end 25. Instead, the contact switch 52 may be arranged on each of the basal end 25 and the distal end 26. In this case, when all the contact switches 52 are turned off, the controller 40 gives an affirmative determination result in step S3.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A forklift, comprising:
a fork that mounts a pallet;
a lift cylinder that raises and lowers the fork; and
a tilt cylinder that tilts the fork, wherein
the fork includes an insertion portion for insertion into an insertion opening of the pallet,
the pallet includes a first defining surface and a second defining surface that at least partially define the insertion opening and face each other in an up-down direction,
the second defining surface is located below the first defining surface,
the forklift further comprises:
a pressure sensor configured to detect an internal pressure of the lift cylinder;
a contact sensor configured to detect whether the insertion portion is in contact with the first defining surface; and
processing circuitry, and
the processing circuitry is configured to:
execute a process that lowers the fork until the contact sensor detects that the insertion portion is not in contact with the first defining surface in a state in which the pallet is mounted on the fork;
execute, after the process that lowers the fork, a process that tilts the fork forward relative to the forklift until the internal pressure of the lift cylinder detected by the pressure sensor becomes less than the internal pressure of the lift cylinder in a state in which the pallet is not mounted on the fork;
execute a process that tilts the fork rearward relative to the forklift by a predetermined amount after the process that tilts the fork forward; and
execute a process that pulls out the insertion portion from the insertion opening after the process that tilts the fork rearward by the predetermined amount.

2. The forklift according to claim 1, wherein
the processing circuitry is configured to:
determine, during the process that tilts the fork forward, whether the internal pressure of the lift cylinder detected by the pressure sensor becomes less than a threshold value; and
execute the process that pulls out the insertion portion from the insertion opening when the fork reaches a tilt limit without the internal pressure of the lift cylinder becoming less than the threshold value, and
the threshold value is set to determine whether the internal pressure of the lift cylinder is less than the internal pressure of the lift cylinder in the state in which the pallet is not mounted on the fork.

3. The forklift according to claim 1, wherein the processing circuitry is configured to execute a process that arranges a distal end of the insertion portion above a basal end of the insertion portion before executing the process that lowers the fork.

4. A method for controlling a forklift, the forklift including a fork that mounts a pallet, a lift cylinder that raises and lowers the fork, and a tilt cylinder that tilts the fork, wherein the fork includes an insertion portion for insertion into an insertion opening of the pallet, the pallet includes a first defining surface and a second defining surface that at least partially define the insertion opening and face each other in an up-down direction, the second defining surface is located below the first defining surface, the method comprises:

lowering the fork until the insertion portion separates from the first defining surface in a state in which the pallet is mounted on the fork;

after lowering the fork, tilting the fork forward relative to the forklift until the internal pressure of the lift cylinder becomes less than the internal pressure of the lift cylinder in a state in which the pallet is not mounted on the fork;

tilting the fork rearward relative to the forklift by a predetermined amount after tilting the fork forward; and pulling out the insertion portion from the insertion opening after tilting the fork rearward by the predetermined amount.

* * * * *